US012415362B2

(12) United States Patent
Karasawa et al.

(10) Patent No.: US 12,415,362 B2
(45) **Date of Patent: *Sep. 16, 2025**

(54) FLOW PATH UNIT AND LIQUID EJECTION APPARATUS

(71) Applicant: SEIKO EPSON CORPORATION, Tokyo (JP)

(72) Inventors: Masashi Karasawa, Chino (JP); Takayoshi Mizuno, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 245 days.

This patent is subject to a terminal disclaimer.

(21) Appl. No.: 18/182,727

(22) Filed: Mar. 13, 2023

(65) Prior Publication Data

US 2023/0294411 A1 Sep. 21, 2023

(30) Foreign Application Priority Data

Mar. 15, 2022 (JP) ................................ 2022-039997

(51) Int. Cl.
*B41J 2/175* (2006.01)

(52) U.S. Cl.
CPC .................................... *B41J 2/175* (2013.01)

(58) Field of Classification Search
CPC ...... B41J 2/175; B41J 2/17509; B41J 2/1752; B41J 2/17523; B41J 2/18
See application file for complete search history.

(56) References Cited

U.S. PATENT DOCUMENTS

| | | | | |
|---|---|---|---|---|
| 7,325,911 B2 * | 2/2008 | Katayama | B41J 2/17523 347/86 |
| 2010/0002061 A1 * | 1/2010 | Shibano | B41J 2/17509 403/4 |
| 2015/0224780 A1 * | 8/2015 | Ono | B41J 2/17596 347/86 |
| 2021/0060961 A1 * | 3/2021 | Maeshima | A61M 39/24 |

FOREIGN PATENT DOCUMENTS

| | | |
|---|---|---|
| JP | H05-026381 Y | 7/1993 |
| JP | 2004-150576 A | 5/2004 |
| JP | 2010-144884 A | 7/2010 |

* cited by examiner

*Primary Examiner* — Anh T Vo
(74) *Attorney, Agent, or Firm* — WORKMAN NYDEGGER

(57) ABSTRACT

A flow path unit includes a first flange including a part of a flow path, and a second flange detachably coupled to the first flange and including a part of the flow path, wherein the first flange includes a facing surface that faces the second flange when the second flange is coupled to the first flange, the facing surface is provided with an O-ring annularly surrounding the flow path, a contact surface being in contact with the O-ring annularly surrounding the flow path, and a liquid gasket disposed on the contact surface, and the contact surface is provided with at least one recessed portion.

4 Claims, 12 Drawing Sheets

FLOW PATH UNIT AND LIQUID EJECTION APPARATUS

The present application is based on, and claims priority from JP Application Serial Number 2022-039997, filed Mar. 15, 2022, the disclosure of which is hereby incorporated by reference herein in its entirety.

BACKGROUND

1. Technical Field

The present disclosure relates to a flow path unit and a liquid ejection apparatus.

2. Related Art

In the related art, for example, in a liquid ejection apparatus or the like, a flow path unit has been used. The flow path unit is configured such that a plurality of members each having a flow path of liquid are coupled to each other by way of an O ring, and the O-ring and a contact surface on which the O-ring is disposed are provided at a coupling portion of the plurality of members. For example, JP-A-5-26381 discloses a seal structure which is configured such that an oil pump housing having an oil passage and a cylinder block having an oil passage are coupled to each other, and an O-ring and a fitting groove into which the O-ring is fitted are provided at a coupling portion between the oil pump housing and the cylinder block.

In the known flow path unit where the O-ring and the contact surface are provided at the coupling portion of the plurality of members, there is a case where a foreign substance enters between the O-ring and the contact surface. When a foreign substance enters between the O-ring and the contact surface, there is a possibility that the liquid leaks from the flow path. Here, in the seal structure disclosed in JP-5-A-26381, a liquid gasket filling groove is formed around the fitting groove. However, in the seal structure disclosed in Japanese Utility Model Publication No. 5 (1993)-26381, the fitting groove and the liquid gasket filling groove are separately formed at positions separated from each other and hence, in the same manner with the known general flow path unit in which an O-ring and a contact surface are provided at a coupling portion of a plurality of members, when a foreign substance enters between the O-ring and the fitting groove which is the contact surface, there is a possibility that liquid leaks from the flow path.

SUMMARY

A flow path unit according to an aspect of the present disclosure is a flow path unit that includes a flow path configured to supply liquid to an ejection portion that is configured to eject the liquid, the flow path unit including a first flange including a part of the flow path, and a second flange detachably coupled to the first flange and including a part of the flow path, wherein the first flange includes a facing surface that faces the second flange when the second flange is coupled to the first flange, the facing surface is provided with an O-ring annularly surrounding the flow path, a contact surface being in contact with the O-ring annularly surrounding the flow path, and a liquid gasket disposed on the contact surface, and the contact surface is provided with at least one recessed portion.

A liquid ejection apparatus according to another aspect of the present disclosure is a liquid ejection apparatus that includes an ejection portion configured to eject liquid, and a flow path configured to supply the liquid to the ejection portion, the liquid ejection apparatus including a first flange including a part of the flow path, and a second flange detachably coupled to the first flange and including a part of the flow path, wherein the first flange includes a facing surface that faces the second flange when the second flange is coupled to the first flange, the facing surface is provided with an O-ring annularly surrounding the flow path, a contact surface being in contact with the O-ring annularly surrounding the flow path, and a liquid gasket disposed on the contact surface, and the contact surface is provided with at least one recessed portion.

DESCRIPTION OF EXEMPLARY EMBODIMENTS

Figure 1:
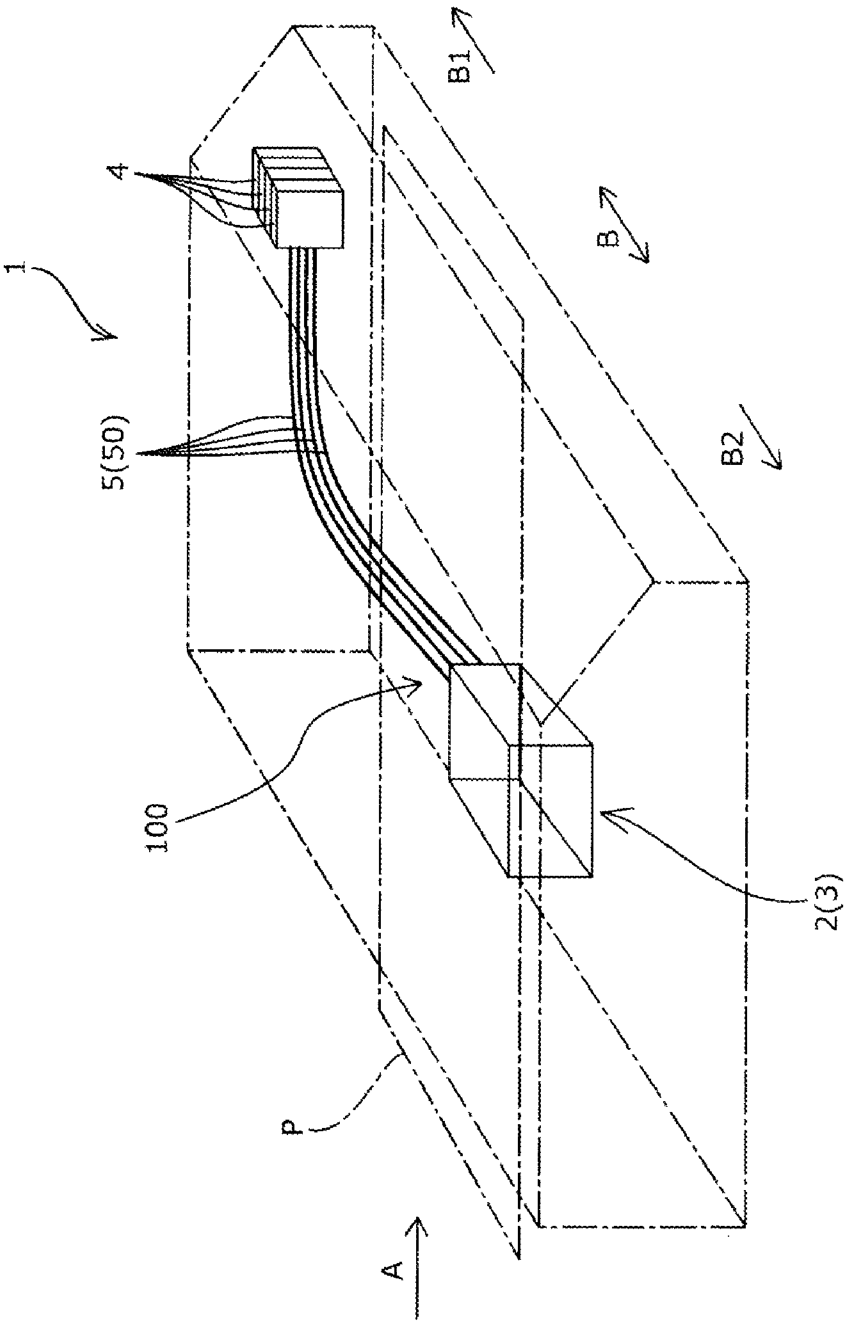
FIG. 1 is a schematic perspective view illustrating a liquid ejection apparatus according to a first embodiment of the present disclosure.

Hereinafter, the present disclosure will be schematically described.

A flow path unit according to a first aspect of the present disclosure is a flow path unit that includes a flow path configured to supply liquid to an ejection portion that is configured to eject the liquid, the flow path unit including a first flange including a part of the flow path, and a second flange detachably coupled to the first flange and including a part of the flow path, wherein the first flange includes a facing surface that faces the second flange when the second flange is coupled to the first flange, the facing surface is provided with an O-ring annularly surrounding the flow path, a contact surface being in contact with the O-ring annularly surrounding the flow path, and a liquid gasket disposed on the contact surface, and the contact surface is provided with at least one recessed portion.

According to this aspect, in the facing surface, the liquid gasket is disposed on the contact surface on which the O-ring is disposed, and at least one recessed portion is provided on the contact surface. Accordingly, when a foreign substance enters between the O-ring and the contact surface, the liquid gasket can wrap the foreign substance via the recessed portion. That is, it is possible to suppress the occurrence of a gap in the facing surface due to entry of a foreign substance between the O-ring and the contact surface. Accordingly, even in a case where a foreign substance enters between the O-ring and the contact surface, it is possible to bring about a state where the liquid gasket wraps around the foreign substance and hence, the lowering of sealing performance at the facing surface can be suppressed.

A flow path unit according to a second aspect of the present disclosure is characterized in that, in the flow path unit according to the first aspect, the O-ring is provided with an annular groove annularly surrounding the flow path.

According to this aspect, the O-ring is provided with the annular groove that annularly surrounds the flow path. Accordingly, the O-ring can accommodate the liquid gasket in the annular groove, and a large amount of liquid gasket can be disposed in the annular groove. Therefore, it is possible to particularly effectively suppress the lowering of the sealing performance at the facing surface.

A flow path unit according to a third aspect of the present disclosure is characterized in that, in the flow path unit according to the first or second aspect, at least one of the recessed portions annularly surrounds the flow path.

According to this aspect, at least one of the recessed portions annularly surrounds the flow path. With such a configuration, even when a foreign substance enters from any direction on the facing surface, it is possible to bring about a state where the liquid gasket wraps around the foreign substance and hence, the lowering of the sealing performance on the facing surface can be suppressed.

A liquid ejection apparatus according to a fourth aspect of the present disclosure is a liquid ejection apparatus that includes an ejection portion configured to eject liquid, and a flow path configured to supply the liquid to the ejection portion, the liquid ejection apparatus including a first flange including a part of the flow path, and a second flange detachably coupled to the first flange and including a part of the flow path, wherein the first flange has a facing surface that faces the second flange when the second flange is coupled to the first flange, the facing surface is provided with an O-ring annularly surrounding the flow path, a contact surface being in contact with the O-ring annularly surrounding the flow path, and a liquid gasket disposed on the contact surface, and the contact surface is provided with at least one recessed portion.

According to this aspect, in the facing surface, the liquid gasket is disposed on the contact surface on which the O-ring is disposed, and at least one recessed portion is provided on the contact surface. Accordingly, even in a case where a foreign substance enters between the O-ring and the contact surface, it is possible to bring about a state where the liquid gasket wraps around the foreign substance and hence, it is possible to eject the liquid while suppressing the lowering of sealing performance at the facing surface.

First Example

Hereinafter, a liquid ejection apparatus provided with a flow path unit according to one embodiment of the present disclosure will be described in detail with reference to attached drawings. First, the liquid ejection apparatus according to a first embodiment of the present disclosure is schematically described.

The liquid ejection apparatus 1 according to the present embodiment is configured to perform recording on a medium P transported in a transport direction A by a transport unit not illustrated in the drawing by moving a carriage 2 provided with an ejection unit 3 configured to eject ink on a side opposite to the medium P in a reciprocating manner in a scanning direction B intersecting with the transport direction A. To be more specific, the medium P is intermittently driven in the transport direction A, the ejection unit 3 is moved in a reciprocating manner (scanned in a reciprocating manner) in the scanning direction B via the carriage 2, and ink is ejected from a plurality of nozzles not illustrated in the drawing formed in the ejection unit 3 thus performing recording. Here, one direction of the scanning directions B is referred to as a direction B1, and the other direction of the scanning directions B is referred to as a direction B2.

The ejection unit 3 of the present embodiment is an inkjet head including a piezoelectric element. However, the present disclosure is not limited to such a configuration, and a thermal head including a heater may be used instead of the piezoelectric element. Further, the carriage 2 is coupled to ink cartridges 4 that respectively store black ink, cyan ink, magenta ink, and yellow ink by way of ink tubes 5 that constitute a part of the flow path unit 100 and also constitute flow paths 50 for inks. The flow path unit 100 is provided on a direction B1 side of the carriage 2, and the detailed configuration of the flow path unit 100 will be described later. Further, the ejection unit 3 is configured to eject black ink, cyan ink, magenta ink, and yellow ink, and nozzle rows corresponding to the respective inks are formed along the transport direction A. The number of colors of ink is not limited to these four colors, and may be more or less than four colors, or other colors may be adopted.

Figure 2:
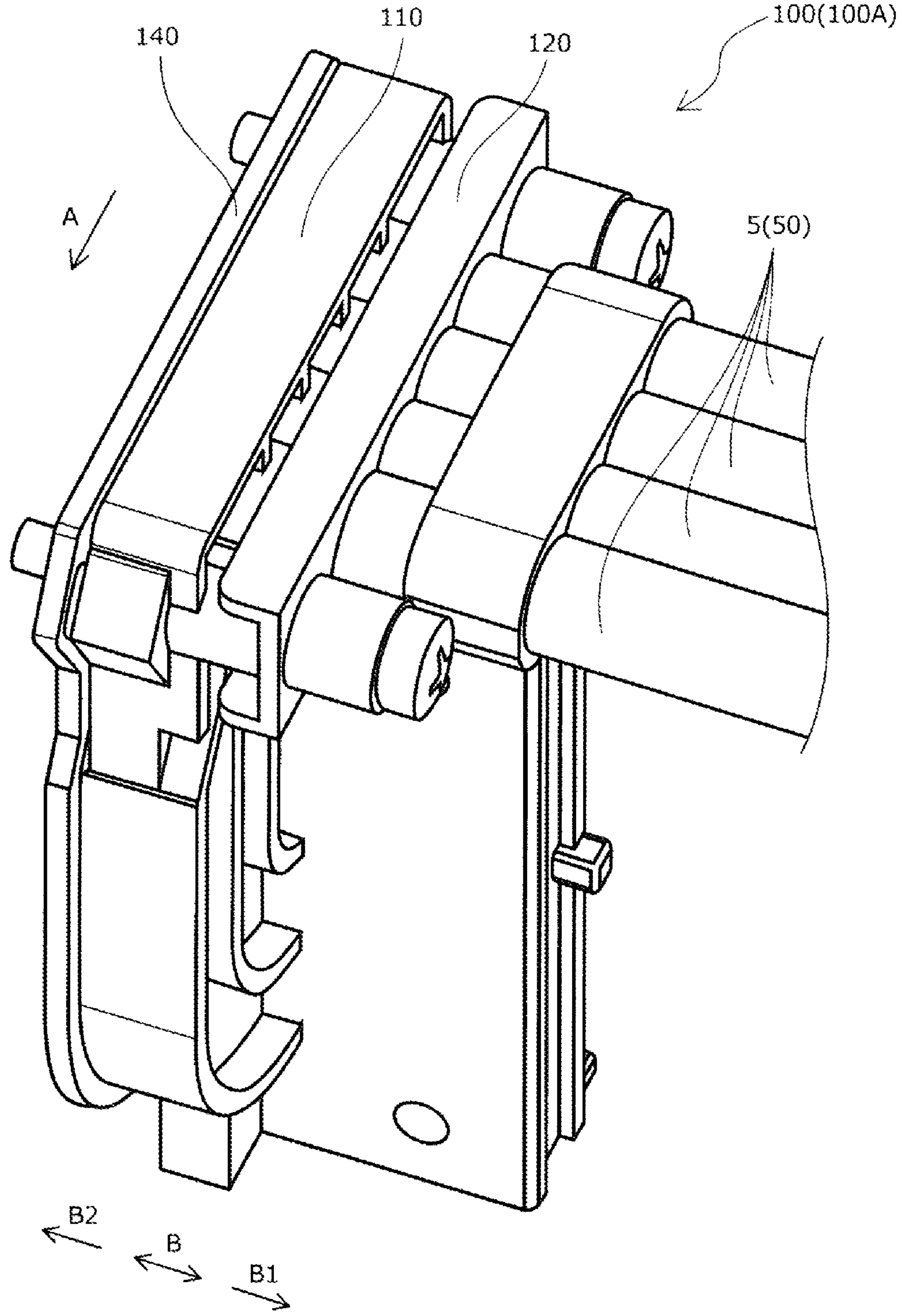
FIG. 2 is a perspective view illustrating a flow path unit of the liquid ejection apparatus in FIG. 1.

Next, a detailed configuration of the flow path unit 100 (flow path unit 100A) in the liquid ejection apparatus 1 according to the present embodiment will be described with reference to FIG. 2 to FIG. 9, FIG. 11, and FIG. 12. As illustrated in FIG. 2, the flow path unit 100A according to the present embodiment includes a tube-side flange member 120 coupled to the ink tubes 5, and a carriage-side flange member 110. Then, the tube-side flange member 120 and the carriage-side flange member 110 are coupled to each other, and the carriage-side flange member 110 is fixed to the carriage 2 by way of a fixing member 140.

Figure 3:
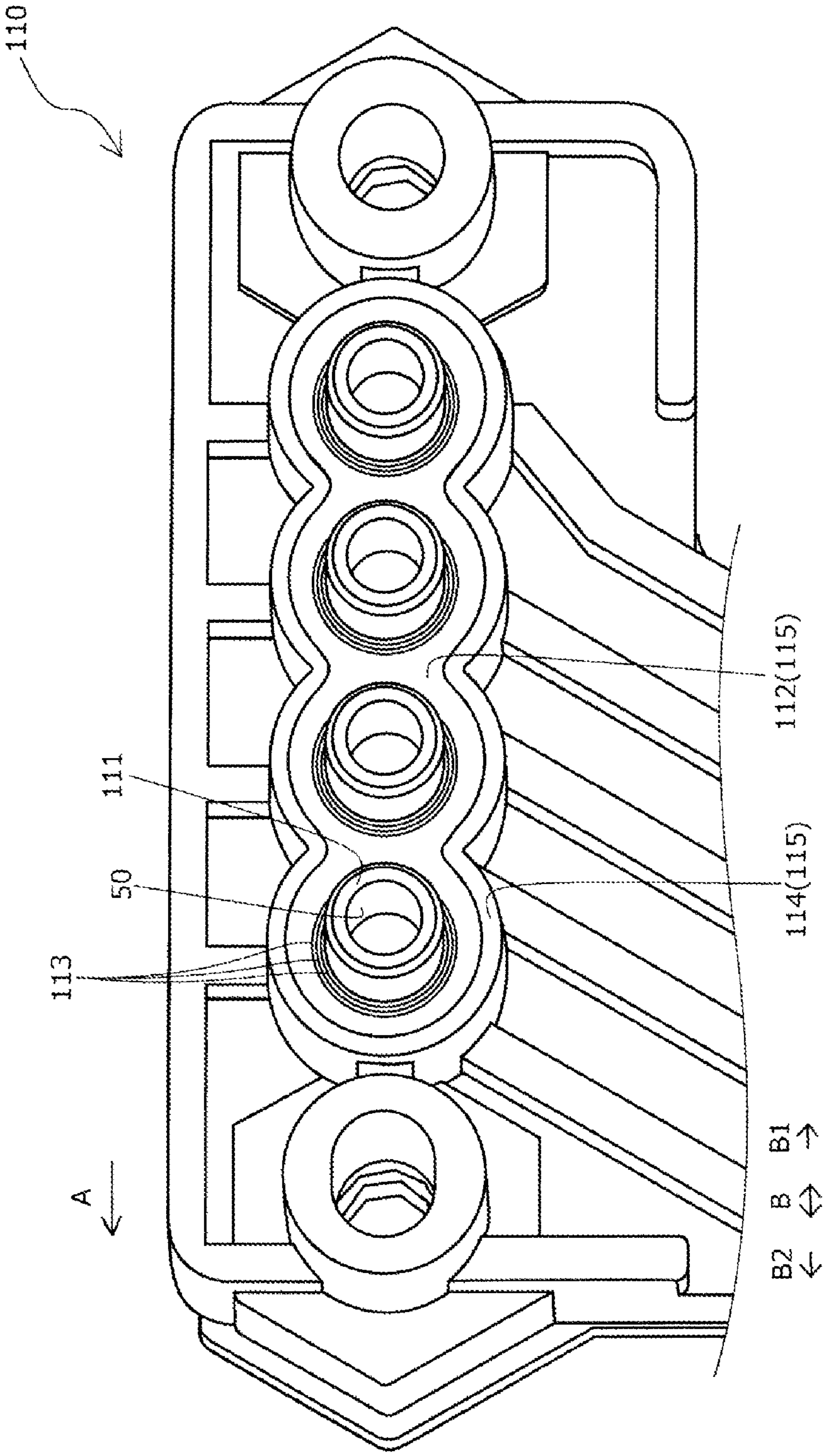
FIG. 3 is a perspective view illustrating a carriage-side flange of the flow path unit of the liquid ejection apparatus in FIG. 1.
Figure 4:
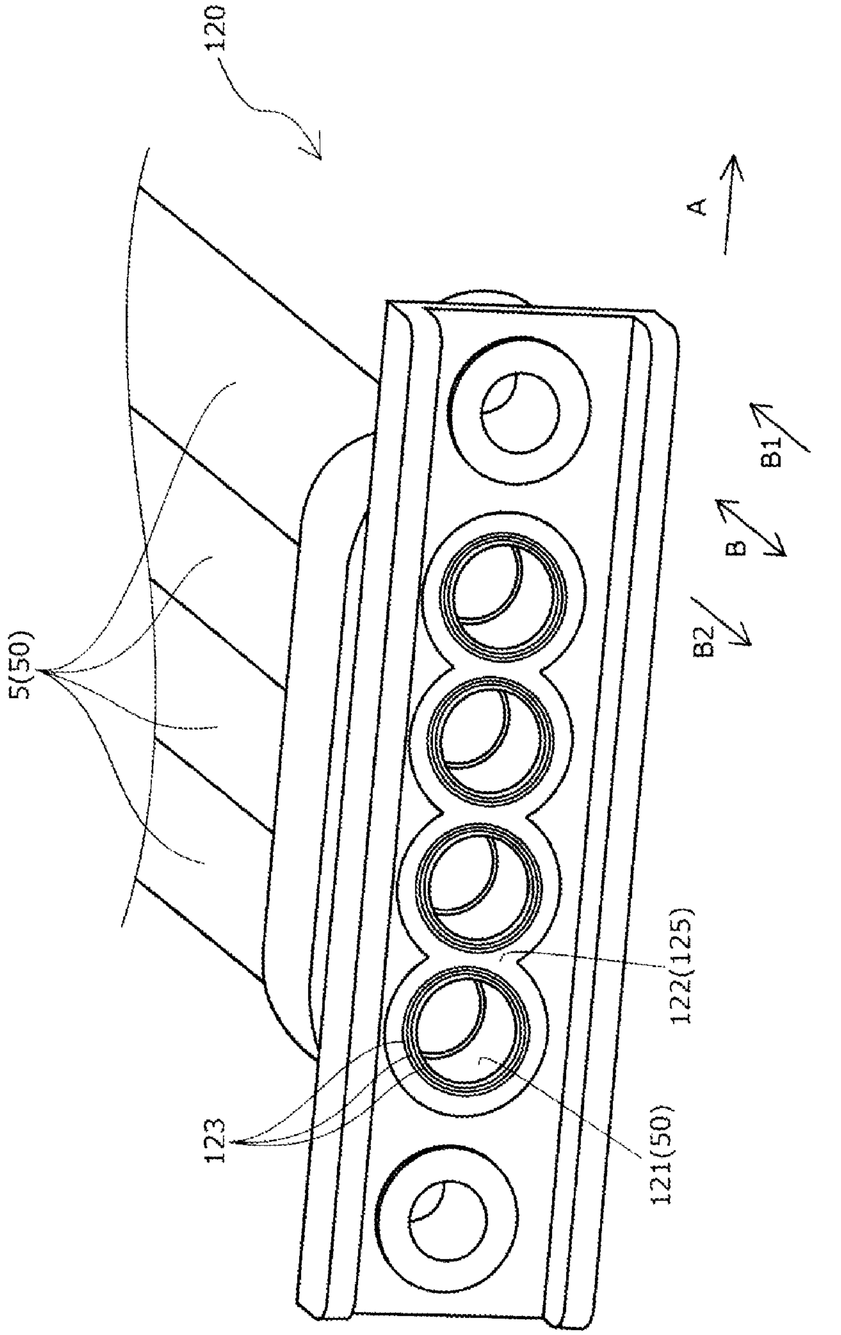
FIG. 4 is a perspective view illustrating an ink-cartridge-side flange of the flow path unit of the liquid ejection apparatus in FIG. 1.

Here, FIG. 3 illustrates a side of the carriage-side flange member 110 facing the tube-side flange member 120, and FIG. 4 illustrates a side of the tube-side flange member 120 facing the carriage-side flange member 110. As illustrated in FIG. 3, the carriage-side flange member 110 has four cylindrical portions 111 constituting a part of a flow path 50, a planar portion 112 positioned around the cylindrical portions 111, and a convex portion 114 positioned around the planar portion 112. The planar portion 112 is provided with a plurality of recessed portions 113 annularly surrounding the cylindrical portion 111. On the other hand, as illustrated in FIG. 4, the tube-side flange member 120 has four hole portions 121 constituting a part of the flow path 50, and a pedestal-shaped planar portion 122 positioned around the hole portions 121. The planar portion 122 is provided with a plurality of recessed portions 123 annularly surrounding the hole portion 121. The four cylindrical portions 111 and the four hole portions 121 respectively correspond to four inks of black ink, cyan ink, magenta ink, and yellow ink.

In the present embodiment, the recessed portion 113 and the recessed portion 123 have substantially the same configuration. However, a recessed portion provided to the carriage-side flange member 110 and a recessed portion provided to the tube-side flange member 120 may have different configurations, or a configuration may be adopted where a recessed portion is provided to only one of the carriage-side flange member 110 and the tube-side flange member 120.

Figure 5:
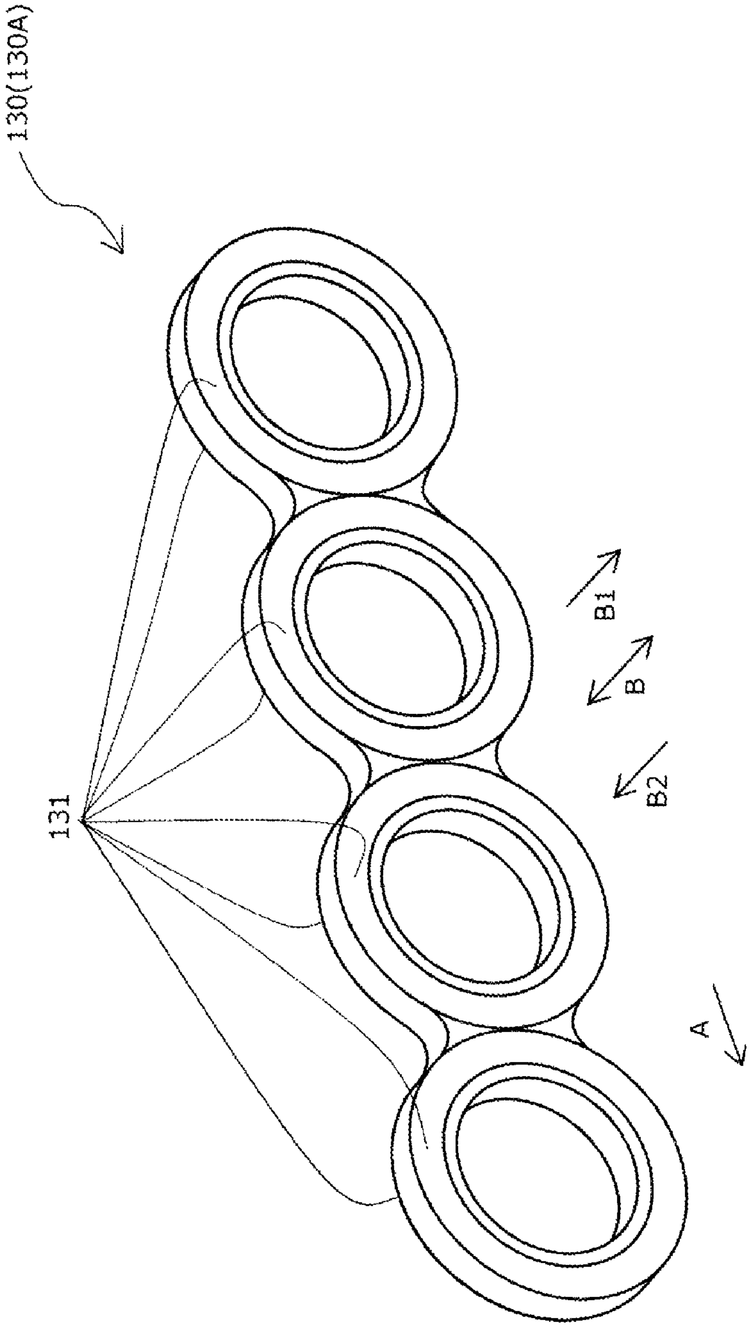
FIG. 5 is a perspective view illustrating an O-ring of the flow path unit of the liquid ejection apparatus in FIG. 1.

The carriage-side flange member 110 and the tube-side flange member 120 are coupled to each other at a position where the cylindrical portions 111 are inserted into the hole portions 121 and the planar portion 112 and the planar portion 122 face each other. When the carriage-side flange member 110 and the tube-side flange member 120 are coupled to each other, a quadruple O-ring 130 illustrated in FIG. 5 is disposed at a position between the planar portion 112 and the planar portion 122. The O-ring 130 has convex portions 131, since the convex portion 131 is pressed by the planar portion 112 and the planar portion 122, the carriage-side flange member 110 and the tube-side flange member 120 are sealed. Here, although the O-ring 130 according to the present embodiment has a quadruple ring configuration, the O-ring 130 is not limited to such a configuration.

Figure 6:
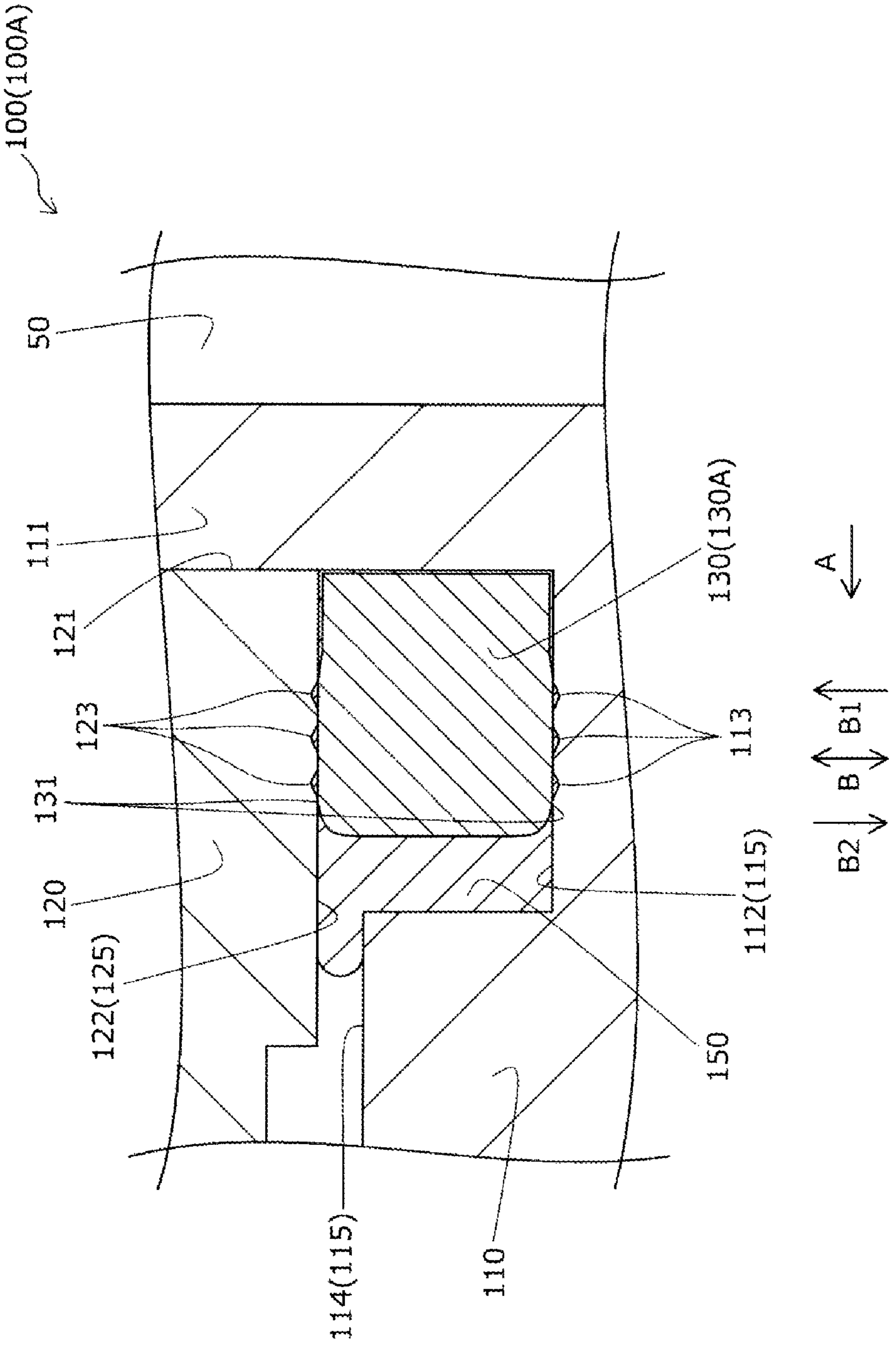
FIG. 6 is a schematic cross-sectional view illustrating a coupling portion between the carriage-side flange and the ink-cartridge-side flange of the flow path unit of the liquid ejection apparatus in FIG. 1.
Figure 7:
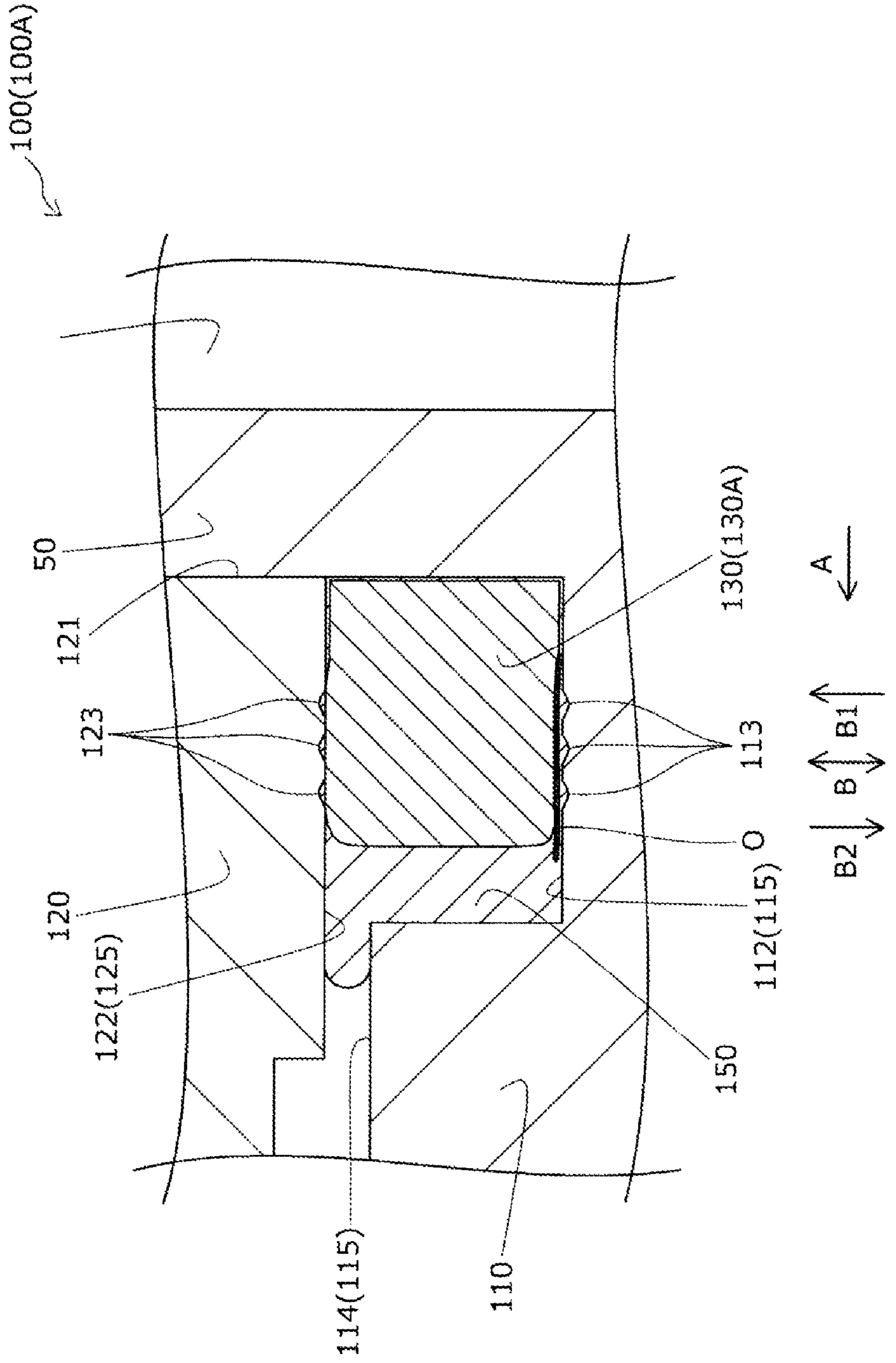
FIG. 7 is a schematic cross-sectional view illustrating a state where a foreign substance enters the coupling portion in FIG. 6.

Further, in the flow path unit 100A of the present embodiment, a liquid gasket 150 is disposed at a position where the planar portion 112 and the planar portion 122 face each other, that is, a position around the O-ring 130. Here, FIG. 6 and FIG. 7 are schematic cross-sectional views illustrating a position between the planar portion 112 and the planar portion 122 in an enlarged manner. As illustrated in FIG. 6 and FIG. 7, recessed portions 113 and recessed portions 123 are provided at positions of the planar portion 112 and the planar portion 122 facing the O-ring 130, and the liquid gasket 150 is disposed also in the recessed portions 113 and the recessed portions 123. By disposing the liquid gasket 150 in this manner, for example, even when a foreign substance O enters between the O-ring 130 and the plane portion 112 or the like that is a contact surface with the O-ring 130 as illustrated in FIG. 7, it is possible to bring about a state where the liquid gasket 150 wraps the foreign substance O and hence, the lowering of the sealing performance at the facing surface 115 of the carriage-side flange member 110 and at the facing surface 125 of the tube-side flange member 120 can be suppressed. In the flow path unit 100A of the present embodiment, the facing surface 115 is constituted of the planar portion 112 and the convex portion 114, and the facing surface 125 is constituted of the planar portion 122.

Figure 11:
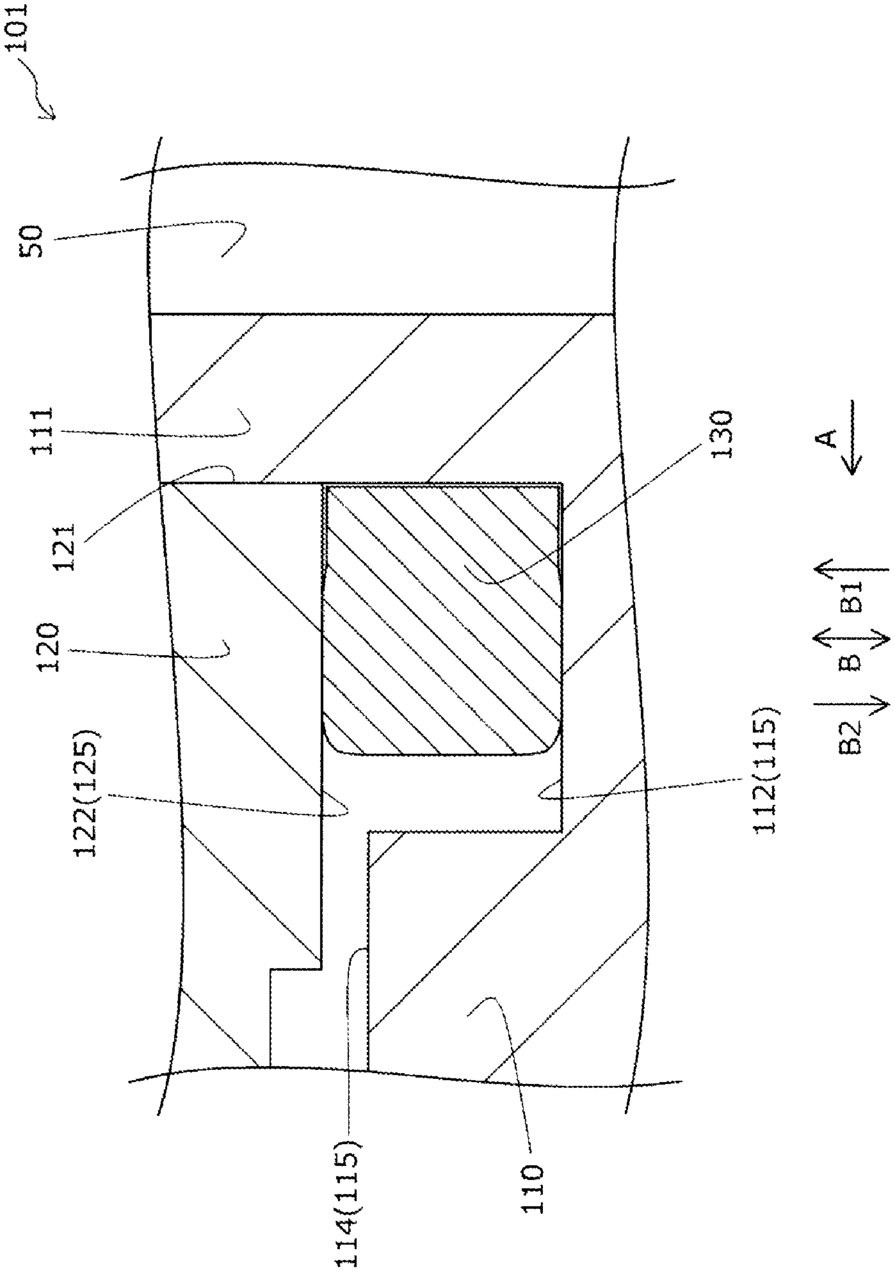
FIG. 11 is a schematic cross-sectional view illustrating a coupling portion between a carriage-side flange and an ink-cartridge-side flange of a flow path unit of a liquid ejection apparatus of a reference example.
Figure 12:
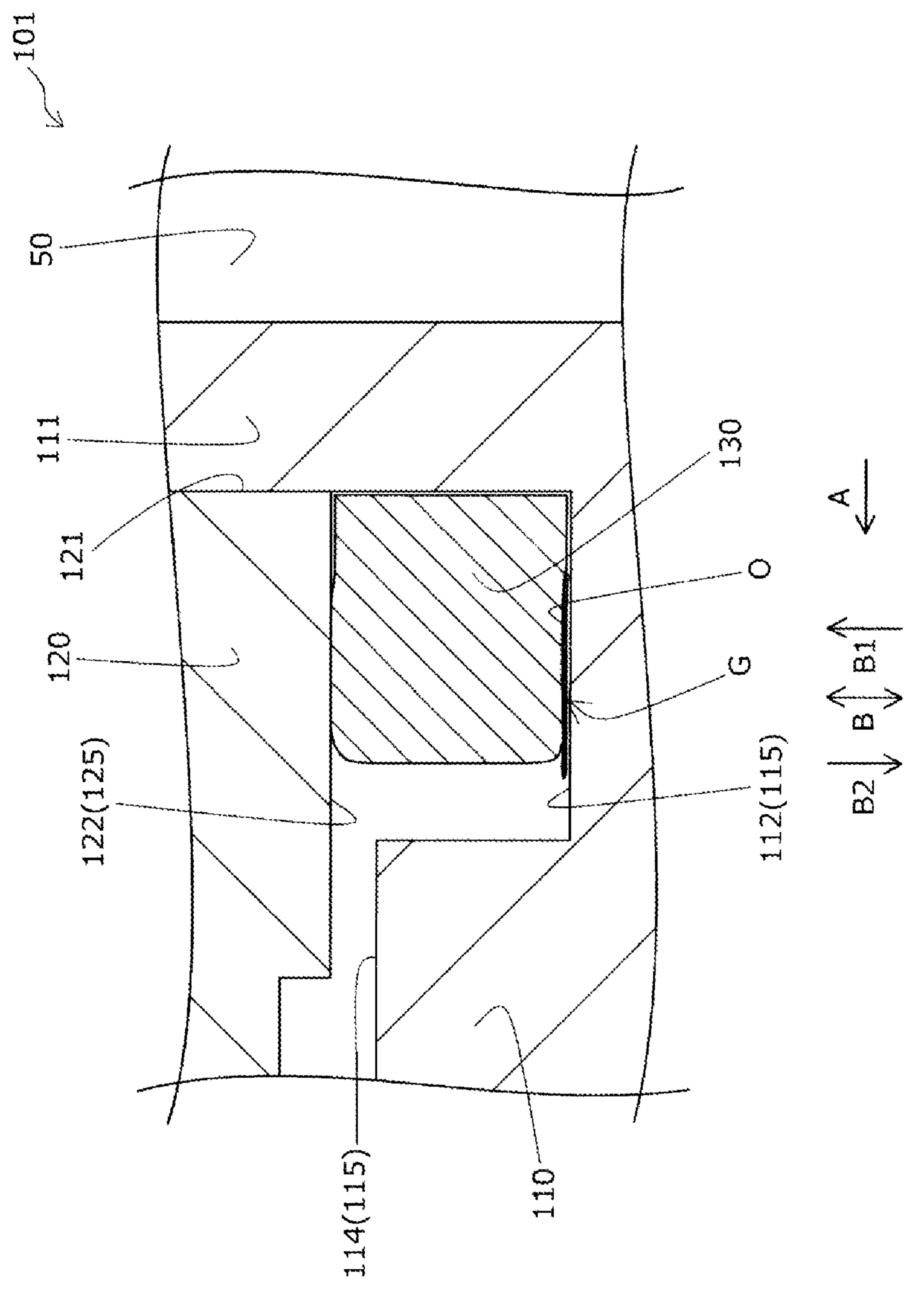
FIG. 12 is a schematic cross-sectional view illustrating a state where a foreign substance enters the coupling portion in FIG. 11.

Here, FIG. 11 and FIG. 12 are schematic cross-sectional views illustrating a position between a planar portion 112 and a planar portion 122 of a flow path unit 101 of a liquid ejection apparatus of a reference example in an enlarged manner. The liquid ejection apparatus of the reference example has substantially the same configuration as the flow path unit 100A of the present embodiment except that the planar portion 112 and the planar portion 122 have no recessed portion, and the liquid gasket is not disposed on a facing surface 115 of a carriage-side flange member 110 and a facing surface 125 of a tube-side flange member 120. With such a configuration, in FIG. 11 and FIG. 12 constitutional members corresponding to those of the flow path unit 100A of the present embodiment are expressed by giving the same symbols.

As illustrated in FIG. 11 and FIG. 12, the flow path unit 101 of the liquid ejection apparatus of the reference example has no recessed portion in the planar portion 112 and the planar portion 122, and the liquid gasket is not disposed on the facing surface 115 of the carriage-side flange member 110 and the facing surface 125 of the tube-side flange member 120. Accordingly, as illustrated in FIG. 12, when a foreign substance O enters between the O-ring 130 and the planar portion 112 or the like that is a contact surface with the O-ring 130, a gap G is generated. Therefore, the sealing performance at the facing surface 115 of the carriage-side flange member 110 and the facing surface 125 of the tube-side flange member 120 is lowered. When the sealing performance at the facing surface 115 of the carriage-side flange member 110 and the facing surface 125 of the tube-side flange member 120 is lowered, there is a possibility that the ink leaks out from the flow path 50 through the gap G.

As described above, the flow path unit 100A according to the present embodiment is the flow path unit 100 including the flow path 50 for supplying ink to the ejection unit 3 configured to eject ink that is liquid. Further, the flow path unit 100A includes a carriage side flange member 110 as a first flange having a part of the flow path 50 and a tube-side flange member 120 as a second flange detachably coupled to the carriage-side flange member 110 and having a part of the flow path 50. Here, the carriage-side flange member 110 has a facing surface 115 that faces the tube-side flange member 120 when the tube-side flange member 120 is coupled to the carriage-side flange member 110, on the facing surface 115, an O-ring 130 that annularly surrounds the flow path 50, a planar portion 112 as a contact surface with which the O-ring 130 is brought into contact in a state of annularly surrounding the flow path 50, and a liquid gasket 150 disposed on the planar portion 112 are provided, and at least one recessed portion 113 is provided to the planar portion 112.

In the flow path unit 100A of the present embodiment, in the above-mentioned description, the tube-side flange member 120 may be regarded as a first flange, and the carriage-side flange member 110 may be regarded as a second flange. To be more specific, the flow path unit 100A of the present embodiment includes the tube-side flange member 120 as a first flange having a part of the flow path 50, and the carriage-side flange member 110 as a second flange detachably coupled to the tube-side flange member 120 and having a part of the flow path 50. Here, the tube-side flange member 120 has a facing surface 125 that faces the carriage-side flange member 110 when the carriage-side flange member 110 is coupled to the tube-side flange member 120, on the facing surface 125, an O-ring 130 that annularly surrounds the flow path 50, a planar portion 122 as a contact surface with which the O-ring 130 is brought into contact in a state of annularly surrounding the flow path 50, and a liquid gasket 150 disposed on the planar portion 112 are provided, and at least one recessed portion 123 is provided to the planar portion 122.

As described above, in the facing surface (at least one of the facing surfaces 115 and 125), the liquid gasket 150 is disposed on the contact surface (at least one of the planar portion 112 and the planar portion 122) on which the O-ring 130 is disposed, and at least one recess is provided to the contact surface. Accordingly, when a foreign substance O enters between the O-ring 130 and the contact surface, the liquid gasket 150 can wrap the foreign substance O via the recessed portion. That is, it is possible to suppress the occurrence of a phenomenon that the gap G is generated at the facing surface due to entry of the foreign substance O between the O-ring 130 and the contact surface. Accordingly, even in a case where a foreign substance O enters between the O-ring 130 and the contact surface, it is possible to bring about a state where the liquid gasket 150 wraps around the foreign substance O and hence, the lowering of the sealing performance at the facing surface can be suppressed. Further, for example, even in a case where the O-ring 130 is deformed due to change with time or the like, it is possible to bring about a state where the liquid gasket 150 wraps around a deformed portion of the O-ring 130 and hence, it is possible to suppress the lowering of the sealing performance at the facing surface.

Here, describing from the viewpoint of the liquid ejection apparatus, the liquid ejection apparatus 1 according to the present embodiment is a liquid ejection apparatus including the flow path unit 100 having the above-described characteristics, the ejection unit 3 configured to eject ink that is liquid, and the flow path 50 configured to supply ink to the ejection unit 3. Accordingly, even in a case where a foreign substance O enters between the O-ring 130 and the contact surface, it is possible to bring about a state where the liquid gasket 150 wraps around the foreign substance O and hence, it is possible to eject the liquid while suppressing the lowering of the sealing performance at the facing surface.

Here, as illustrated in FIG. 3, in the flow path unit 100A of the present embodiment, the recessed portions 113 annularly surround the cylindrical portion 111 constituting the flow path 50. Further, as illustrated in FIG. 4, in the flow path unit 100A of the present embodiment, the recessed portions 123 annularly surround the hole portion 121 constituting the flow path 50. As described above, it is preferable that at least one of the recessed portion 113 and the recessed portion 123 annularly surround the flow path 50. With such a configuration, even when a foreign substance enters from any direction on the facing surface, it is possible to bring about a state where the liquid gasket 15 wraps around the foreign substance O and hence, the lowering of the sealing performance on the facing surface can be suppressed. However, the present disclosure is not limited to such a configuration. For example, a configuration may not be adopted where at least one of the plurality of recessed portions 113 and the plurality of recessed portions 123 annularly surround the flow path 50, and further, a configuration may be adopted where none of the plurality of recessed portions 113 and the plurality of recessed portions 123 annularly surround the flow path 50.

Figure 8:
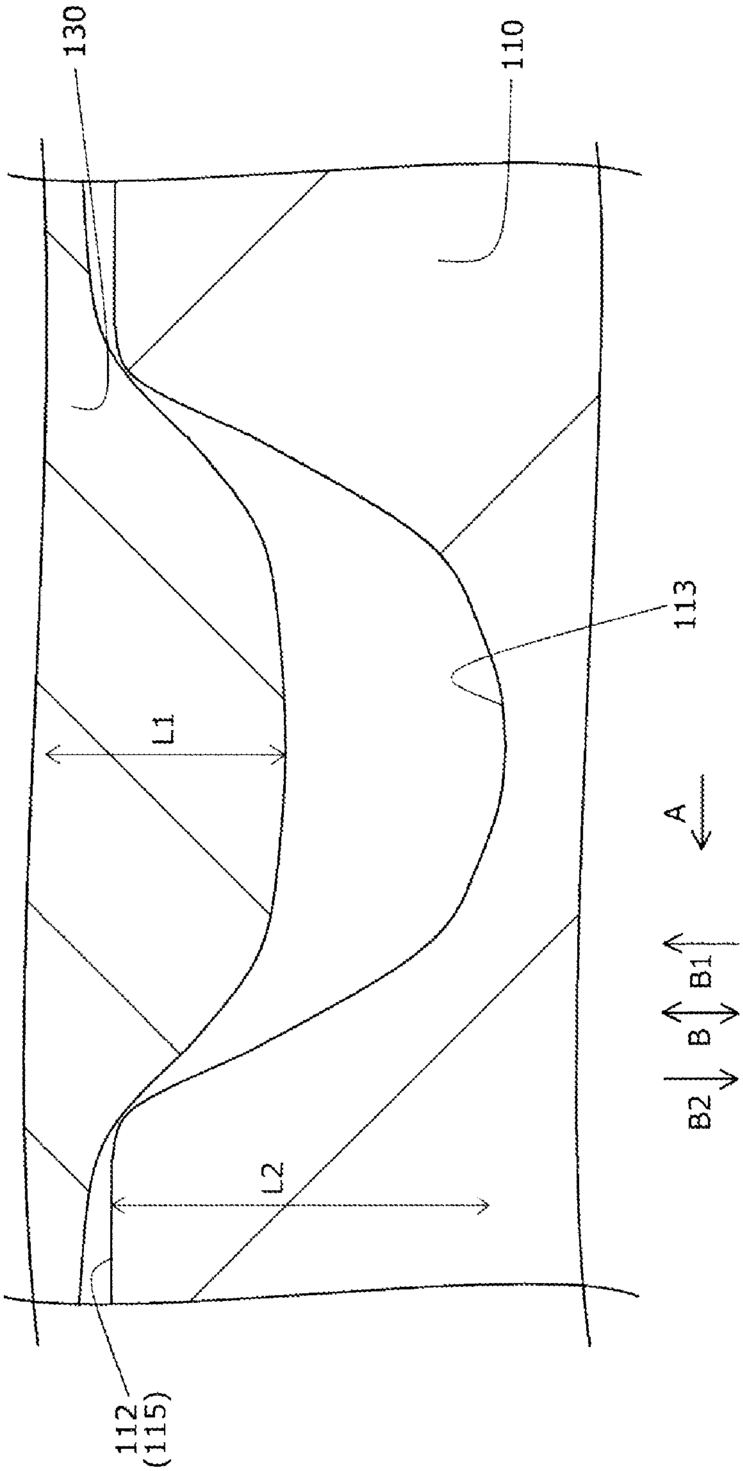
FIG. 8 is a schematic cross-sectional view illustrating a preferred depth of a concave portion of the flow path unit of the liquid ejection apparatus in FIG. 1.

With respect to a preferable configuration of the recessed portion 113 and the recessed portion 123, for example, as illustrated in FIG. 8, assuming a depth of the recessed portion 113 and the recessed portion 123 as L2, and assuming a sinking amount of the O-ring 130 into the recessed portion 113 and the recessed portion 123 as L1, it is preferable that L2 be set to be larger than L1, that is, the relationship of L2>L1 be established. This is because a region for accommodating the liquid gasket 150 can be suitably ensured between the O-ring 130 and the recessed portion 113 and the recessed portion 123.

Figure 9:
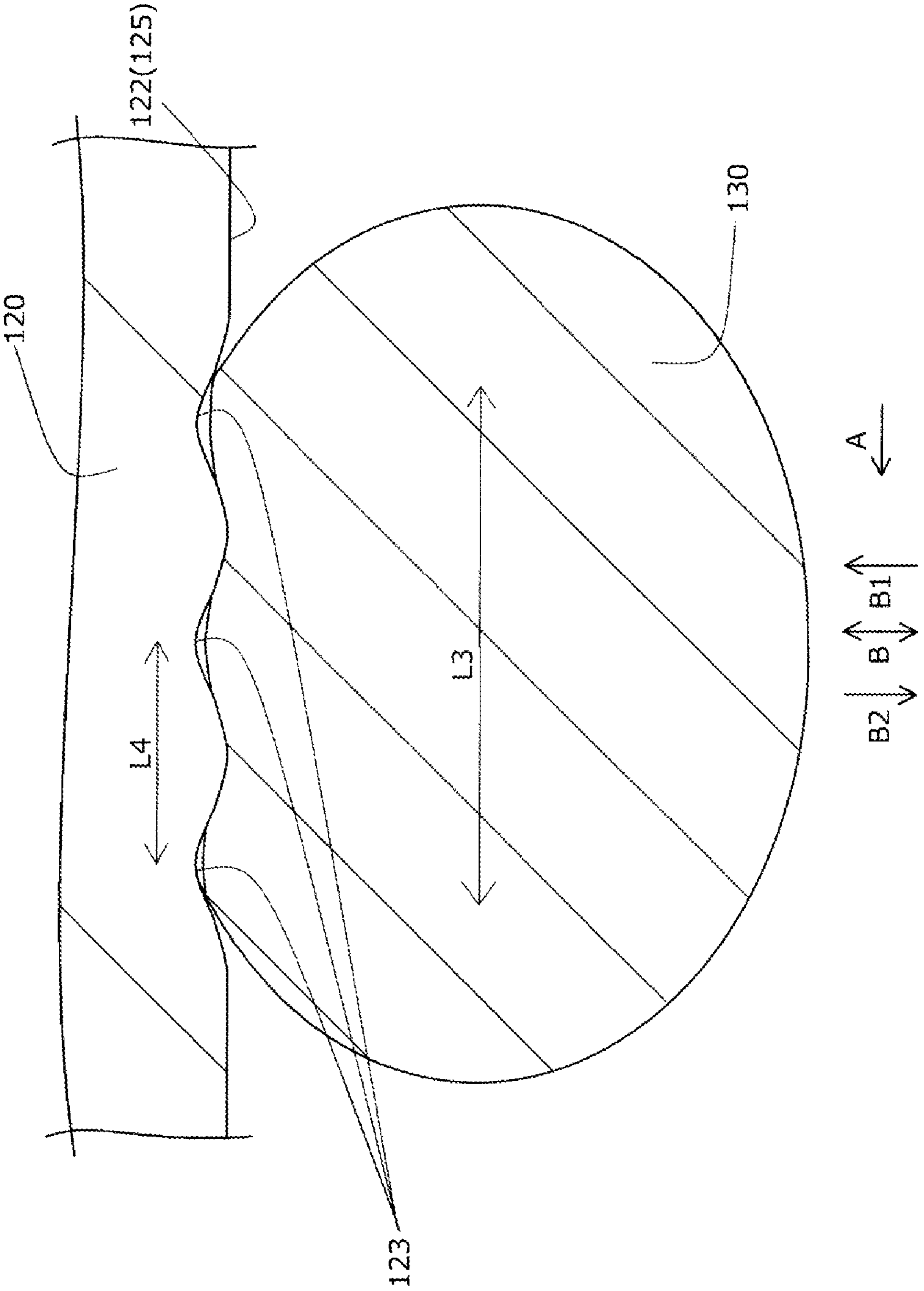
FIG. 9 is a schematic cross-sectional view illustrating a preferred pitch of the recessed portions of the flow path unit of the liquid ejection apparatus in FIG. 1.

Further, as illustrated in FIG. 9, for example, when a plurality of recessed portions 113 and the plurality of recessed portions 123 are formed in the contact surfaces, assuming a forming pitch of the recessed portions 113 and the recessed portions 123 as L4, and a contact length of the O-ring 130 with respect to the contact surface as L3, it is preferable that L3 and L4 be set such that L4 is smaller than a half of the length L3, that is, a relationship of L4<(L3/2) be satisfied. This is because a region for accommodating the liquid gasket 150 can be suitably ensured between the O-ring 130 and the recessed portion 113 and the recessed portion 123.

Second Embodiment

Figure 10:
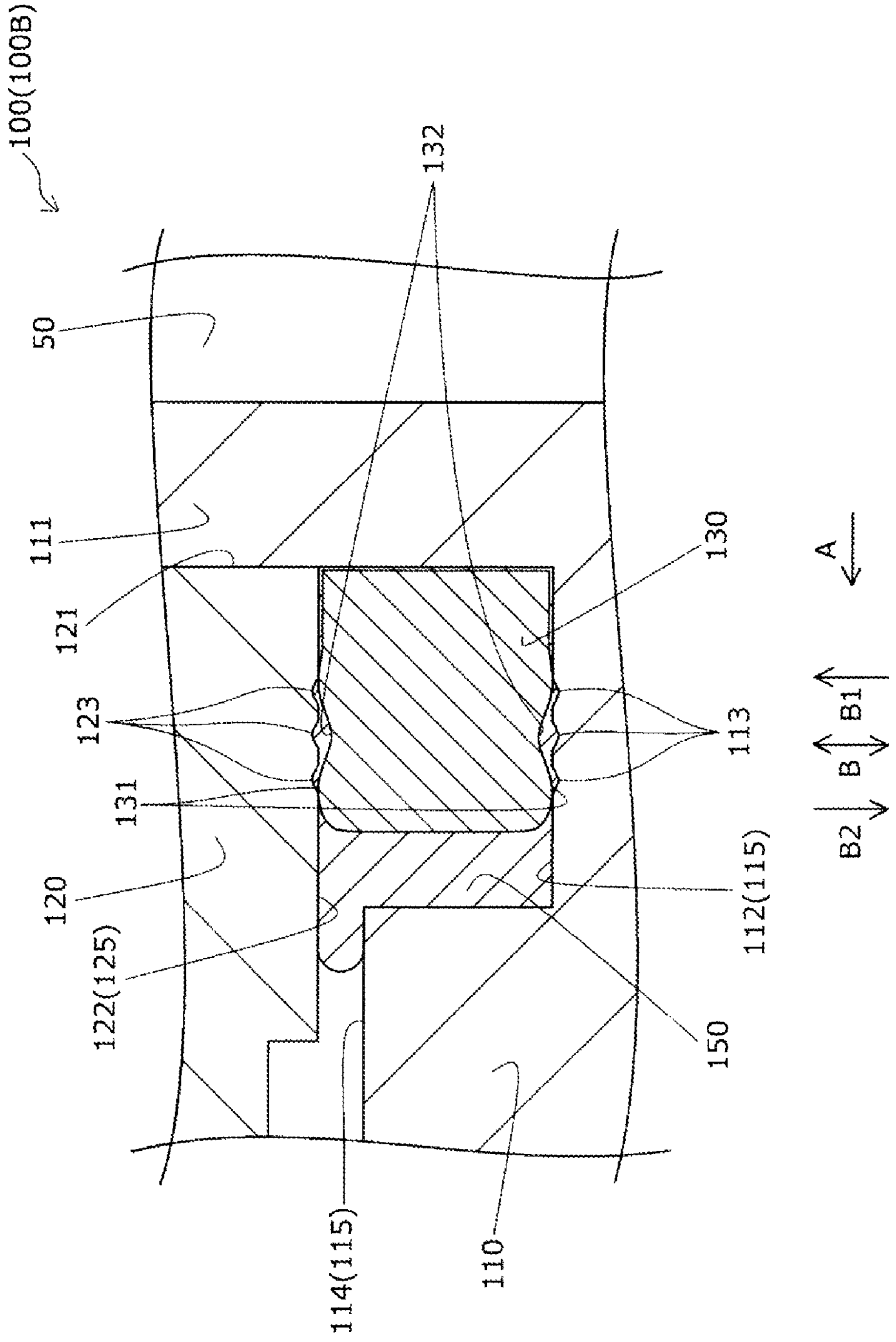
FIG. 10 is a schematic cross-sectional view illustrating a coupling portion between a carriage-side flange and an ink-cartridge-side flange of a flow path unit of a liquid ejection apparatus according to a second embodiment of the present disclosure.

Hereinafter, a flow path unit 100B of a liquid ejection apparatus according to a second embodiment will be described with reference to FIG. 10. Here, FIG. 10 is a view corresponding to FIG. 6 in the liquid ejection apparatus 1 according to the first embodiment. Further, the liquid ejection apparatus of the present embodiment is substantially the same as the liquid ejection apparatus of the first embodiment except for a configuration described hereinafter and hence, the liquid ejection apparatus of the present embodiment has substantially the same characteristics as the liquid ejection apparatus of the first embodiment. Here, in FIG. 10, constitutional elements common to the above-described first embodiment are given the same symbols, and their detailed descriptions will be omitted.

As illustrated in FIG. 5 and FIG. 6, in the flow path unit 100A of the first embodiment, the O-ring 130A had the convex portions 131, and there is no recess or the like in the convex portions 131. On the other hand, as illustrated in FIG. 10, in the flow path unit 100B of the present embodiment, a recess 132 is formed in the convex portion 131. Specifically, in the flow path unit 100B of the present embodiment, an O-ring 130B has the recess 132 formed in the convex portion 131, and the recess 132 is an annular groove that annularly surrounds a flow path 50. Accordingly, in the flow path unit 100B of the present embodiment, the O-ring 132 can accommodate a liquid gasket 150 in the recess 132 that is an annular groove, and a large amount of liquid gasket 150 can be disposed in the recess 132. Therefore, it is possible to particularly effectively suppress the lowering of the sealing performance at the facing surfaces 115 and 125. Further, a large amount of liquid gasket 150 can be disposed in the recess 132 that is an annular groove and hence, it is also possible to suppress the flow-out of the liquid gasket 150 to an unintended place.

Note that the disclosure is not limited to the aforementioned example, and many variations are possible within the scope of the disclosure as described in the appended claims. It goes without saying that such variations also fall within the scope of the disclosure.

What is claimed is:

1. A flow path unit comprising:
- a flow path configured to supply liquid to an ejection unit that is configured to eject the liquid,
- a first flange including a part of the flow path, and
- a second flange detachably coupled to the first flange and including a part of the flow path, wherein
- the first flange includes a facing surface that faces the second flange when the second flange is coupled to the first flange,
- the facing surface is provided with an O-ring annularly surrounding the flow path, a contact surface being in contact with the O-ring annularly surrounding the flow path, and a liquid gasket disposed on the contact surface, and
- the contact surface is provided with at least one recessed portion that is part of the contact surface that contacts the O-ring.

2. The flow path unit according to claim 1, wherein the O-ring is provided with an annular groove annularly surrounding the flow path.

3. The flow path unit according to claim 1, wherein at least one of a plurality of the recessed portions annularly surrounds the flow path.

4. A liquid ejection apparatus comprising:

an ejection unit configured to eject liquid; and a flow path configured to supply the liquid to the ejection unit, the liquid ejection apparatus including a first flange including a part of the flow path, and a second flange detachably coupled to the first flange and including a part of the flow path, wherein the first flange includes a facing surface that faces the second flange when the second flange is coupled to the first flange, the facing surface is provided with an O-ring annularly surrounding the flow path, a contact surface being in contact with the O-ring annularly surrounding the flow path, and a liquid gasket disposed on the contact surface, and the contact surface is provided with at least one recessed portion that is part of the contact surface that contacts the O-ring.

* * * * *